Aug. 21, 1945. R. A. MUSTERED 2,383,208
CUTTING MACHINE
Filed March 3, 1942 3 Sheets-Sheet 3

Inventor
RALPH ARTHUR MUSTERED,
By Frank Fraser
Attorney

Patented Aug. 21, 1945

2,383,208

UNITED STATES PATENT OFFICE 2,383,208

CUTTING MACHINE

Ralph Arthur Mustered, Ottawa, Ill., assignor to Libbey-Owens-Ford Glass Company, Toledo, Ohio, a corporation of Ohio Application March 3, 1942, Serial No. 433,136

7 Claims. (Cl. 33—27)

The present invention relates to improvements in cutting or marking machines and more particularly to apparatus for scoring glass sheets or plates.

Although not necessarily restricted thereto, this invention is especially adaptable to cutting machines of the so-called template type designed to cut out shapes of predetermined outline from plates or sheets of glass. The machine set forth herein as a preferred embodiment of the invention is used for cutting out automobile window or door lights or half windshields and produces a score line which starts and stops at the edge of the glass plate, describing an open pattern.

It is an aim of this invention to provide improved apparatus of the above character whereby large numbers of lights of the same size and shape can be cut from glass sheets or plates in a rapid, accurate, and uniform manner.

Another object is the provision of means for limiting the travel of the cutting or scoring mechanism in a manner to accurately determine the position of the ends of the score line in relation to the edge of the glass plate.

A further object is the provision of cushioning or braking means for gradually retarding the movement of the cutting mechanism toward the end of its travel.

Still another object is the provision of means for receiving the cutting instrumentality at the end of its travel and for holding it in proper starting position between cutting cycles.

Other objects and advantages of the invention will become more apparent during the course of the following description when taken in connection with the accompanying drawings.

In the drawings wherein like numerals are employed to designate like parts throughout the same:

Fig. 5 is a vertical section through the holding and braking means taken substantially on line 5—5 in Fig. 1; and Fig. 6 is a vertical section through the cutter holding means taken substantially on line 6—6 in Fig. 1.

Figure 1:
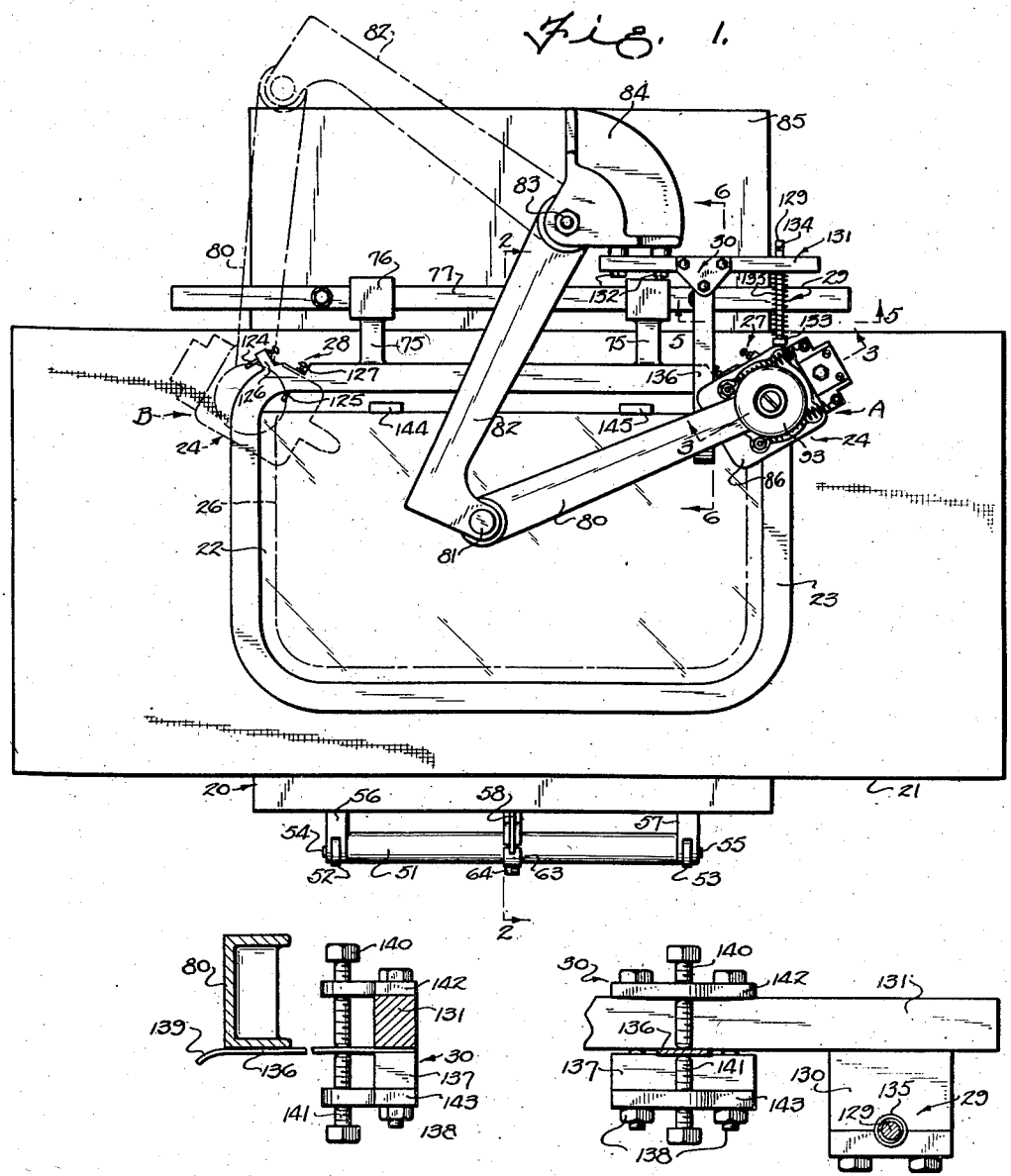
Fig. 1 is a plan view of a glass cutting machine constructed in accordance with the invention.

Briefly stated, the cutting machine disclosed in the drawings comprises a supporting structure 20 having associated therewith a vertically movable table 21 upon which a glass plate 22 is supported during the cutting operation. Positioned above the table 21 in vertically spaced relation is a horizontally arranged track template 23, of the same configuration as the shape or form it is desired to cut from the glass plate. A cutting unit designated in its entirety by the numeral 24 and provided with a cutting tool 25 (Fig. 3) is mounted upon the template 23, being adapted to travel around the template and to be guided thereby to score the glass plate 22 along the line of cut indicated at 26 in Fig. 1. At the rear of the table 21 and positioned in the path of the cutting unit 24, at opposite ends of its cutting stroke, are adjustable stop means 27 and 28, and associated with the stop 27 are a bumper or brake 29 and a receiving and retaining device 30, also adapted to engage the cutting unit at one end of its travel.

The table 21 is normally in the lowered position indicated in broken lines in Fig. 2, and while in this position the glass plate 22 to be scored is placed on the table and the cut plate is subsequently removed therefrom. However, during the actual cutting operation, it is necessary to move the table 21 upwardly into the position shown in full lines in Fig. 2 in order to bring the upper surface of the glass plate 22 into operative contact with the cutting tool 25 (Fig. 3). To this end, the table 21 is movably mounted upon the supporting structure 20 which comprises a substantially rectangular, horizontal frame formed preferably of angle irons and supported upon vertical posts 31.

Figure 2:
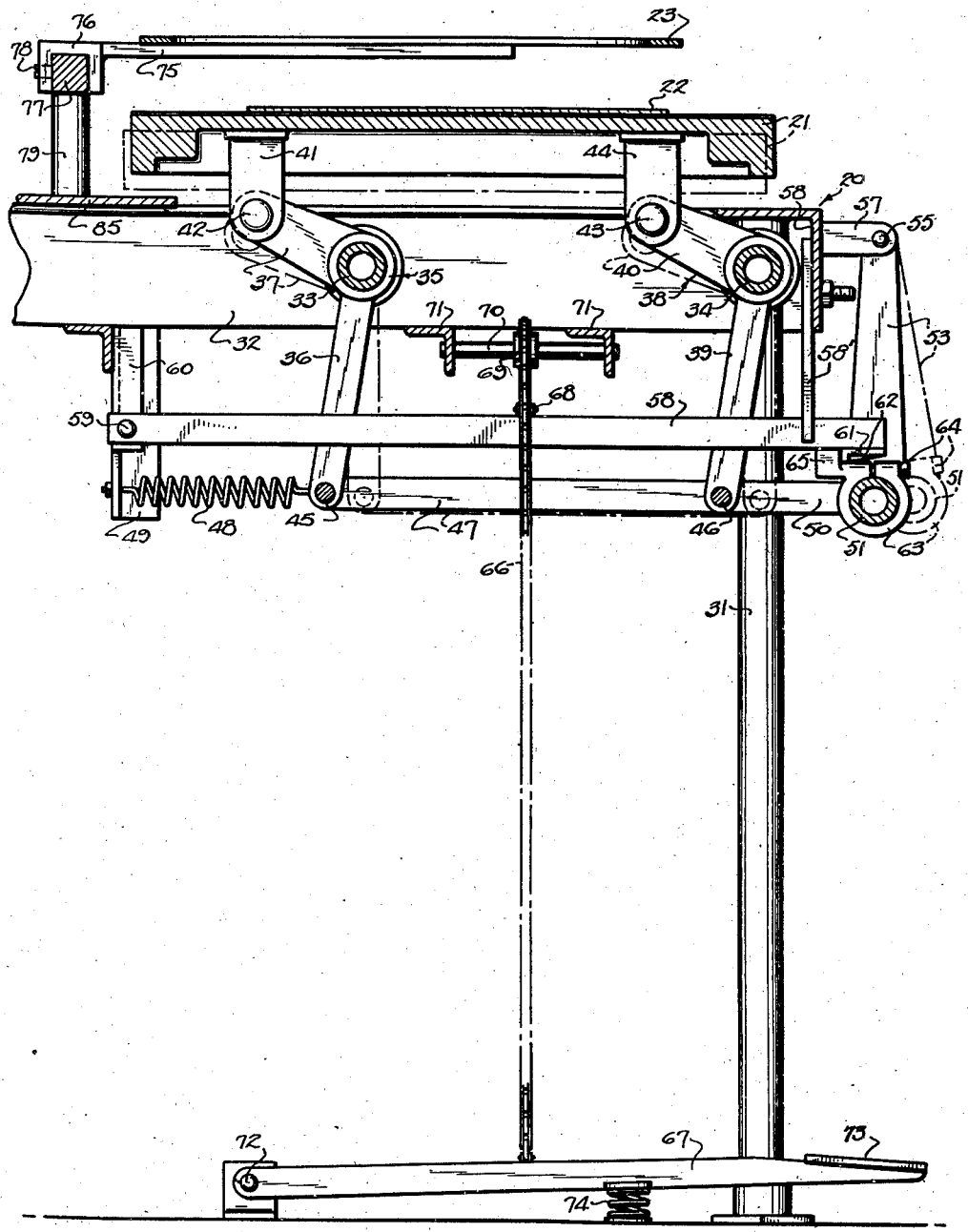
Fig. 2 is a transverse, vertical section taken substantially on line 2—2 in Fig. 1.
Figure 3:
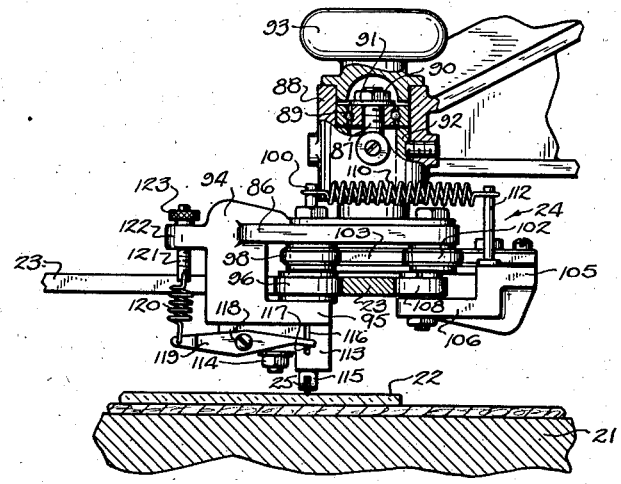
Fig. 3 is a vertical section through the cutting unit taken substantially on line 3—3 in Fig. 1.

Extending longitudinally of the table and rotatably carried by side members 32 of the supporting frame 20 are the spaced, parallel shafts 33 and 34 (Fig. 2). Fixed to the shaft 33, adjacent its opposite ends, are bell-crank levers 35 (only one of which is shown) each comprising a substantially vertical depending leg 36 and a substantially horizontal, relatively shorter leg 37. Keyed to the shaft 34 opposite bell-crank levers 35 on shaft 33 are similar levers 38 each comprising a depending leg 39 and a substantially horizontal shorter leg 40.

The table 21 is rectangular in plan and has secured to the underside thereof, spaced brackets 41 to which the horizontal legs 37 of bell-crank levers 35 are pivoted as at 42 while the horizontal legs 40 of bell-crank levers 38 are pivoted as at 43 to similar brackets 44 also carried upon the underside of the table.

The depending legs 36 of bell-crank levers 35 are connected together at their lower ends by a horizontal rod 45 and a similar rod 46 connects the lower ends of the depending legs 39 of bell-crank levers 38. The parallel rods 45 and 46 are in turn connected together adjacent their opposite ends by horizontal links 47 so that all of the bell-crank levers will be caused to operate in unison. Fastened to the rod 45 is one end of a tension spring 48 having its opposite end attached to a bracket 49 secured to the supporting framework 20. The spring 48 tends to normally urge the bell-crank levers in a clockwise direction to raise the table 21, but it is not of sufficient strength to alone effect such raising.

The means for raising the table top 21 includes links 50 connecting the rod 46 with a tubular member 51 pivotally carried at its opposite ends by the vertical hangers 52 and 53 pivoted at their upper ends as at 54 and 55 to bracket plates 56 and 57 respectively secured to the front member 58 of the supporting frame 20. Thus, when the tubular member 51 is forced inwardly, all of the bell-crank levers will be simultaneously rocked in a clockwise direction upon shafts 33 and 34 to effect the desired raising of the table 21. This raising of the table will be assisted by the action of the spring 48 which, as previously pointed out, always tends to raise the table, although not of sufficient strength to alone effect such raising.

The table 21 is adapted to be maintained in raised position during the cutting of the glass plate, and means is provided for locking the table in this position. There is provided for this purpose a horizontal locking bar 58, said bar being pivoted at its rear end as at 59 to a bracket 60 carried by the supporting frame 20 and provided at its forward end with a latch plate 61, the undersurface 62 of which inclines rearwardly and downwardly. Associated with the locking bar 58 is a split collar 63 fitting around the tubular member 51 intermediate the ends thereof and secured in place by a screw or the like 64. The collar 63 is provided with a vertically projecting lug 65 which is adapted to cooperate with the latch plate 61 on the locking bar 58 to lock the table in raised position.

In operation, when the tubular member 51 is moved inwardly to effect the raising of the table 21, the lug 65 engaging the inclined bottom surface 62 of latch plate 61 will act to raise the locking bar 58, but just as soon as the lug 65 passes inwardly beyond latch plate 61, the bar 58 will fall downwardly so that the latch plate 61 will be disposed in front of lug 65 as shown in Fig. 2, whereby to prevent lowering of the table until the locking bar 58 is again raised to release the lug 65. The release of the locking means is so be effected by the operator after the cutting operation has been completed, whereupon the table will move downwardly by its own weight. To this end, there is provided a chain 66 fastened at one end to a foot pedal 67 and at its opposite end to the locking bar 58 as at 68, said chain 66 passing upwardly and over a sprocket 69 keyed to a horizontal shaft 70 journaled in the angle members 71 carried by supporting frame 20. The foot pedal 67 has a pivotal mounting 72 at its inner end and a foot engaging portion 73 at its outer end, said foot pedal being normally urged upwardly by a compression spring 74 positioned intermediate the ends thereof. Upon downward pressure upon the outer end 73 of the foot pedal, the forward end of the locking bar 58 will be lifted upwardly to release the lug 65 so that the table will be permitted to fall downwardly into lowered non-cutting position, the downward movement of the table being cushioned by the spring 48. The locking bar 58 may be guided in its vertical movement by a vertical strap 58' carried by supporting frame 20 and having its lower end slotted to receive the said bar therein.

When the table 21 has been raised to the full line position of Fig. 2, bringing the cutting tool 25 into operative engagement with the glass plate 22 (Fig. 3), the operator will move the cutting unit 24 along the template 23 upon which it is supported and guided to produce the core line 26. The template 23 preferably consists of a relatively narrow track of the desired shape and size arranged above the cutting table 21 and supported by horizontal arms 75 having inverted U-shaped ends 76 which fit over a horizontal supporting bar 77 and are secured thereto by set screws 78. The bar 77 is mounted in spaced relation above the supporting frame 20 upon posts 79.

As shown in Fig. 1, the cutting unit 24 is carried at the outer end of a horizontal supporting arm 80 hinged at its inner end as at 81 to a second horizontal arm 82 which is pivoted as at 83 to a bracket 84 mounted upon a platform 85 carried by the supporting frame 20.

Figure 4:
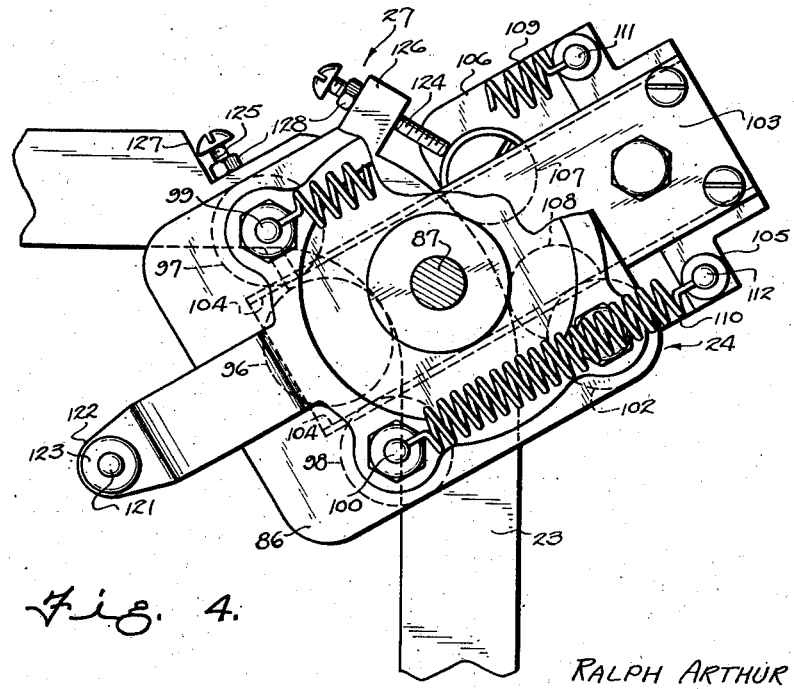
Fig. 4 is a plan view of the cutting unit in the position shown in Fig. 1 with portions broken away.

With reference particularly to Figs. 1, 3 and 4, the cutting unit 24 comprises a substantially rectangular horizontal top plate 86 carrying, substantially centrally thereof, a vertical stem or bolt 87 which passes upwardly through the bearing 88 formed at the outer end of supporting arm 80. Encircling the bolt 87 within bearing 88 are ball bearing assemblies 89 which facilitate the turning of the cutting unit as it travels along the track template. The upper end of bolt 87 terminates within the bearing 88 and has threaded thereupon a nut 90, while interposed between the nut and the ball bearing assembly 89 is a washer 91. The nut and washer prevent the bolt 87 from slipping downwardly through the ball bearing assembly which is held in place by a bushing 92. Fitted in the upper end of the bearing 88 is a hand grip 93 which is adapted to be grasped by the operator in moving the cutting unit along the template.

The horizontal top plate 86 of the cutting unit is formed at one end thereof with a downwardly extending roller support 94 which lies adjacent one side of the template 23, said roller support including a substantially horizontal portion 95 carrying a freely rotatable roller 96 adapted to engage the adjacent side edge of the template.

Carried upon the underside of the top plate 86, adjacent one end thereof, are the opposed rollers 97 and 98 mounted upon vertical spindles 99 and 100 respectively, while carried upon the underside of said top plate adjacent the opposite end thereof are similar rollers 101 and 102 positioned in line with rollers 97 and 98 respectively. Slidably received between these pairs of rollers is a horizontal slide bar 103 positioned above the track template and extending at right angles thereto, said slide bar being provided with grooves 104 in its opposite side faces to receive the rollers 97, 98 and 101, 102 therein, as best illustrated in Fig. 4.

Secured upon the underside of the slide bar 103 at the outer end thereof is a downwardly extending roller support 105 having a substantially horizontal portion 106 carrying a pair of spaced apart, freely rotatable rollers 107 and 108 which engage the adjacent side face of the track 23. The roller 96 carried by roller support 95 engages the opposite side face of the track at a point intermediate the rollers 107 and 108. The rollers 107 and 108 carried by slide plate 103 are urged into engagement with the side face of the template track by springs 109 and 110, said springs being fastened respectively at one end to the roller spindles 99 and 100 and at their opposite ends to vertical posts 111 and 112 mounted upon the roller support 105.

Carried by the roller support 94 is a cutter holder support 113 secured thereto by a bolt or the like 114, said cutter holder support comprising a metallic block having a cylindrical socket formed therein within which a cutter holder 115 is mounted for vertical sliding movement, said cutter holder carrying at its lower end the freely rotatable steel cutting wheel 25. The opposite side walls of the socket formed in the cutter holder support 113 are provided with vertical slots 116 and carried by the cutter holder and operable within these slots are horizontal pins 117, the downward movement of the cutter holder being limited by engagement of the pins 117 with the lower ends of said slots.

Pivotally mounted upon the cutter holder support 113 as at 118 is a lever 119, said lever straddling the cutter holder support and the inner ends thereof engaging pins 117 to normally urge the cutter holder 115 and cutting wheel 25 downwardly. Fastened to the opposite end of the lever 119 is a tension spring 120 attached at its upper end to a bolt 121 passing loosely through an ear 122 formed on the roller support 94 and having a nut 123 threaded upon its upper end. The spring 120 acts to yieldably urge the cutting wheel toward and maintain it in engagement with the glass plate 22.

As the cutting unit 24 is moved along the template 23, the cutting tool 25 engaging the glass plate 22 will produce the score line 26 having its opposite ends at two spaced points along the edge of the plate and describing a three-sided open pattern. In order to prevent spalling of the glass and possible injury to the cutting tool, due to riding of the tool over the edge of the glass plate, it is necessary that the score line be started and stopped inwardly of the plate edge. However, to insure that the scored plate will crack truly along the desired line and give a clean break, it is equally important that the starting and stopping points be as near the edge of the plate as possible.

To this end there has been provided at the rear of the template 23 the adjustable cutter stops 27 and 28, each of which comprises a pair of machine screws 124 and 125. In each case the screw 124 is threaded through an extension 126 on the template 23 while the screw 125 is threaded through the template itself which is notched out as at 127 for this purpose. It will be noted that the screw 124 of each stop is adapted to engage one of the rollers 107 or 108 associated with the slide bar 103 of the cutting unit 24 positioned on the outside of the template 23, while the screw 125 will engage the wheel 96 associated with the top plate 86 and running on the inside of the template 23. This arrangement is extremely important because the screws 124 and 125 can be very accurately adjusted and are held in position by means of the lock nuts 128 so that the two parts of the cutting unit 24 on opposite sides of the template 23 will be stopped at exactly the same time, thus preventing twisting of the head and consequent misalignment and deviation of the cutting tool 25 from the desired line of cut.

As shown in Fig. 1, the glass plate 22 is scored as at 26 by moving the cutting unit 24 from right to left. In other words, the score line is started with the cutting unit in the full line position A and completed when the unit reaches the broken line position B. During the actual cutting operation and until the cutting unit 24 engages the stop 28, the handle 93 will be in the hand of the operator and the cutting unit will be under his control. However, upon completion of the cut, the table 21 will be lowered and the operator's hands must be free to remove the cut plate and replace it with another. Accordingly, as he lowers the table, he pulls the freely running cutting unit 24 toward him with sufficient force to cause the momentum to return it to starting position A.

In order to prevent excessive jar and possible injury to the apparatus by the cutting unit 24 striking the screws 124 and 125 of the stop 27 with too great a force, the bumper 29 is so positioned as to be engaged by the cutting unit toward the end of its rearward travel. The bumper will act as a brake or cushion to retard the speed of movement of the unit and to ease it into contact with the screws 124 and 125. The bumper 29 comprises a rod 129 slidably mounted in a bearing 130 secured to the bottom of a square bar 131 which in turn is fixed to the cutter bracket 84 by means of bolts 132. An enlarged head 133 for engaging the cutting unit 24 is provided at the forward end of the bumper rod 129 while a pin 134 extends through the rod adjacent its opposite end to limit the forward movement thereof. Encircling the rod 129, between the bearing 130 and the head 133, is a compression spring 135 for taking up the shock of the moving unit 24.

Also of importance in facilitating the speed and accuracy of the cutting operation is the cutter retaining means 30 comprising a flat spring member 136 secured between the bar 131 and a clamping piece 137 by means of bolts 138 passing therethrough. The spring 136 has a twofold function, acting to slidingly engage the arm 80 as the cutting unit 24 nears the end of its travel to exert a braking action similar to that of the bumper 29, and, second, to exert a progressively increasing binding action upon the arm 80 so that by the time the cutting unit strikes the screws 124 and 125, the arm will be held so tightly as to prevent any rebound of the cutting unit. In order to insure the arm 80 sliding up on the spring 136, the end of the spring is curved downwardly at its forward end as at 139. Accurate adjustment of the spring tension to give the exact amount of braking and holding action desired can be made by means of the opposed bolts 140 and 141 threaded through brackets 142 and 143 extending outwardly from the bar 131 and clamp member 137 respectively.

With this arrangement, by starting the cutting unit 24 back with sufficient force, the unit will not only be returned to starting position without jarring impact, but will be retained in this position to await the starting of the next succeeding cutting operation. For this reason, after positioning a fresh plate on the table 21, the operator has only to grasp the handle 93 and begin a new cut without taking the time ordinarily required to make sure that the unit 24 is in proper position relative to the edge of the glass plate before starting the cut.

A bumper 29 and holding means 30 can of course be associated with the stop 28 as well as with the stop 27 if desired and such an arrangement will prove very advantageous with some installations; for example, in cases where the cutting unit is designed to make a cutting stroke during both its forward and return travel.

In operation, a glass plate 22 is placed on the table 21, with the back edge of the plate against the locating blocks 144 and 145, while the table is in lowered position (broken lines Fig. 2). The operator then raises the table by pressing the tubular member 51 inwardly until the table is locked in raised position (full lines Fig. 2) and the cutting tool 25 is in cutting engagement with the plate 22 (Fig. 3). By means of the handle 93, he then moves the cutting unit 24 from right to left until the unit engages the stop 28 after producing the score line 26. The glass plate is held in position during the cutting operation by frictional contact with the felt top of the table 21. As soon as the cut has been completed, the operator steps on the foot pedal 67 and the table drops to lowered position, whereupon he starts the cutting unit 24 upon its return travel with sufficient force to carry it back to its original position. Just before arriving at its starting point, the cutting unit 24 will be engaged by the spring 136 and bumper 29 and its speed gradually reduced until it comes into contact with the bolts 124 and 125 of the stop 27. After striking the stop 27, the cutting unit is prevented from moving away by the binding action, on the arm 80, of the spring 136 which also acts to retain the unit in its position against the stop 27 ready for the next cutting stroke. In the meantime the operator, having his hands free, has removed the cut sheet, replaced it with another and is ready to move the table 21 up into cutting position again.

With such an apparatus, it is possible for an operator to cut glass plates rapidly and efficiently and with a minimum amount of lost time or motion. Further, all of the score lines will be uniformly made and each one will start and stop at exactly the proper distance inwardly from the edge of the glass plate to give a clean, accurate break and with practically no attention from the operator.

It will be understood that the apparatus described above could be used for straight line as well as pattern cutting, that supporting and guiding means other than a template might be employed, and also that a stationary table could be used and the cutting tool moved downwardly in order to bring it into cutting engagement with the glass plate. Various other changes in the shape, size and arrangement of parts may be resorted to without departing from the spirit of the invention or the scope of the subjoined claims.

I claim:

1. In a machine for cutting plates or sheets of glass or the like, means for supporting the plate to be cut, a track template mounted above said plate supporting means, a cutting unit including a cutting tool mounted to travel along said template for scoring the plate, and adjustable stop means associated with the template and engageable by said cutting unit at opposite ends of its travel for limiting the movement of said cutting unit in one direction to prevent the cutting tool from moving over the edge of said plate.

2. In a machine for cutting plates or sheets of glass or the like, means for supporting the plate to be cut, a track template mounted above said plate supporting means, a cutting unit including a cutting tool mounted to travel along said template for scoring the plate, said cutting unit comprising relatively movable parts engaging opposite sides of the template, and independently adjustable stop means positioned in the path of each of said movable part and engageable thereby at one end of the travel of the cutting unit for preventing the cutting tool from moving over the edge of the plate.

3. In a machine for cutting plates or sheets of glass or the like, means for supporting the plate to be cut, a cutting unit including a cutting tool mounted for movement over said plate for scoring the same along a predetermined line of cut, stop means positioned in the path of said cutting unit and engageable thereby at one end of its travel for preventing the cutting tool from moving over the edge of the plate, and braking means engageable with the cutting unit for reducing the speed of said unit before it contacts said stop means.

4. In a machine for cutting plates or sheets of glass or the like, means for supporting the plate to be cut, a cutting unit including a cutting tool mounted for movement over said plate for scoring the same along a predetermined line of cut, stop means positioned in the path of said cutting unit and engageable thereby at one end of its travel for preventing the cutting tool from moving over the edge of the plate, and shock absorbing means engageable by the cutting unit before it reaches said stop means.

5. In a machine for cutting plates or sheets of glass or the like, means for supporting the plate to be cut, a cutting unit including a cutting tool mounted for movement over said plate for scoring the same along a predetermined line of cut, stop means positioned in the path of said cutting unit and engageable thereby at one end of its travel for preventing the cutting tool from moving over the edge of the plate, and retaining means engageable with the cutting unit for preventing rebounding of said unit after striking said stop means.

6. In a machine for cutting plates or sheets of glass or the like, means for supporting the plate to be cut, a cutting unit including a cutting tool mounted for movement over said plate for scoring the same along a predetermined line of cut, stop means positioned in the path of said cutting unit and engageable thereby at one end of its travel for preventing the cutting tool from moving over the edge of the plate, and means engageable with the cutting unit in advance of said stop means for progressively reducing the speed of said cutting unit until it reaches the stop means and for preventing rebounding of the unit after striking said stop means.

7. In a machine for cutting plates or sheets of glass or the like, means for supporting the plate to be cut, a cutting unit including a cutting tool mounted for movement over said plate for scoring the same along a predetermined line of cut, stop means positioned in the path of said cutting unit and engageable thereby at one end of its travel for preventing the cutting tool from moving over the edge of the plate, shock absorbing and braking means for taking the impact of the moving cutting unit and for progressively reducing the speed thereof until said unit engages the stop means, and means for retaining said unit in contact with the cutting stop means.

RALPH ARTHUR MUSTERED.